Nov. 7, 1967   J. G. WIATT ET AL   3,350,969
MACHINE FOR CUTTING MATERIAL
Filed May 12, 1965   5 Sheets-Sheet 2

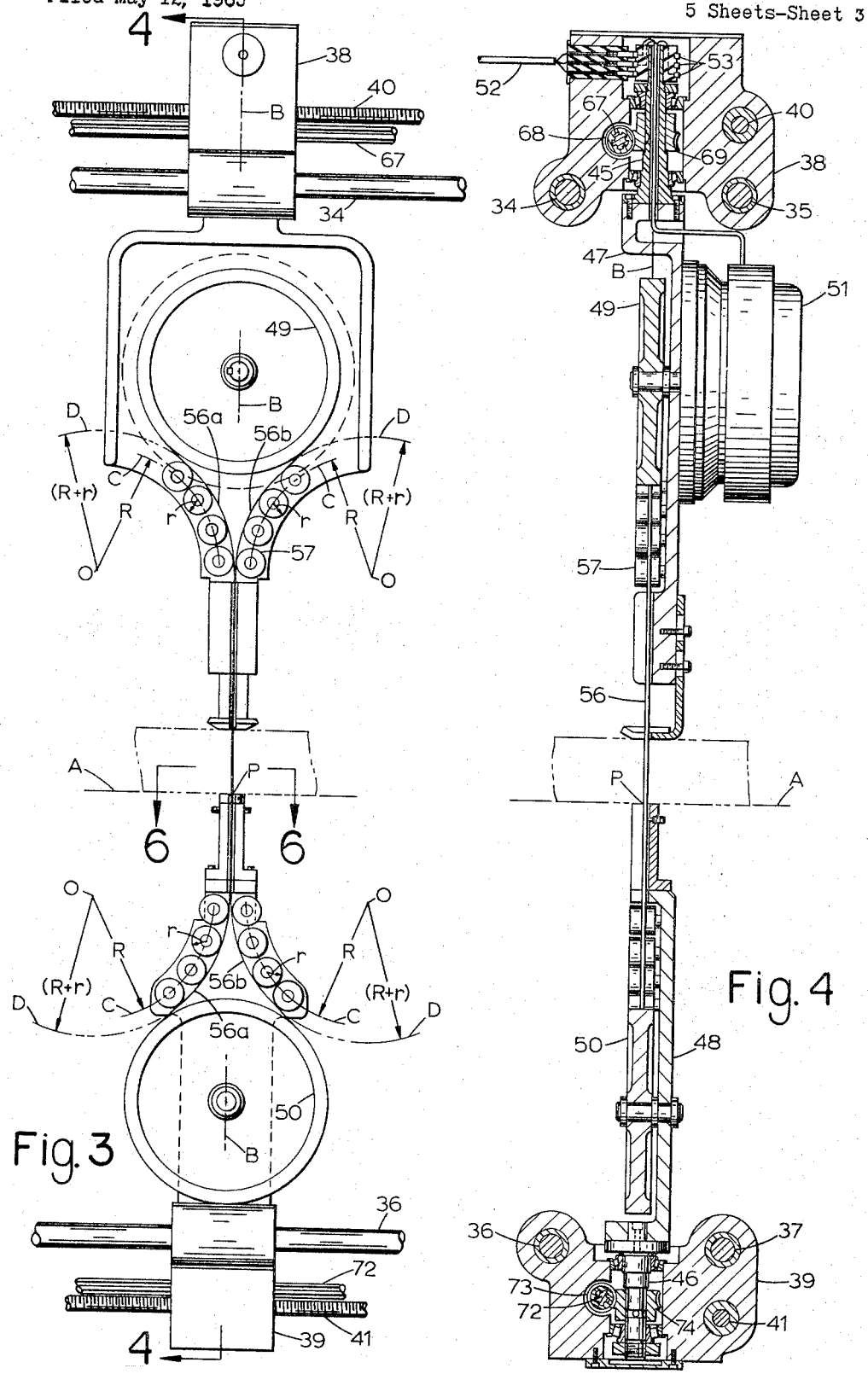

Nov. 7, 1967   J. G. WIATT ETAL   3,350,969
MACHINE FOR CUTTING MATERIAL
Filed May 12, 1965                     5 Sheets-Sheet 5

United States Patent Office 3,350,969
Patented Nov. 7, 1967

3,350,969
MACHINE FOR CUTTING MATERIAL
James G. Wiatt and Edward C. Bruns, Cincinnati, Ohio, assignors to The Cincinnati Milling Machine Co., Cincinnati, Ohio, a corporation of Ohio
Filed May 12, 1965, Ser. No. 455,269
13 Claims. (Cl. 83—201.07)

ABSTRACT OF THE DISCLOSURE

A material cutting machine has an endless band as the cutting blade. The endless band extends around a pair of pulleys, which are disposed on opposite sides of the material being cut. Guide means move the two paths of travel of the endless band close to each other to form a single cutting edge in the cutting plane to cut the material. Each of the pulleys is mounted on a bracket with one of the brackets having a motor supported thereon to rotate the pulley thereon whereby the endless band is driven. Means rotatably mount each of the brackets whereby the pulleys may be turned through 360° about an axis passing through the cutting edge of the blade. The bracket support means are mounted in a carriage for transverse movement relative to the material and the carriage. The carriage is mounted for longitudinal movement relative to the material. The longitudinal movement of the carriage, the transverse movement of the bracket support means, and the turning of the brackets are coordinated to produce a desired cutting pattern.

---

The present invention relates to a machine for cutting material and, more specifically, to a band saw machine suitable for cutting cloth.

In cutting material lying in a cutting plane, it is desirable that the cutting blade be continuously aligned in the direction of relative movement between the blade and the material. Stated another way, the cutting blade should be tangent to the line or curve defining the path of the cut in the material, and when the path turns, the blade should turn. It is also desirable that the blade be taut. Tautness can be realized by using tensioning devices on each side of the cutting plane as, for example, two pulleys which straddle the cutting plane and which carry an endless band saw blade. In the conventional band saw machine, however, the endless blade travels in two spaced paths of travel. This limits the angle through which the blade can be turned in cutting the material.

In the machine of the present invention the blade is carried tautly by two spaced pulleys, one on each side of the cutting plane. The two paths of travel of the blade are drawn together to form a single cutting edge at the cutting plane so that the blade can be turned through a full circle, if necessary, when cutting the material. Means is provided to turn the two pulleys in unison so the blade can be continuously aligned in the direction of relative movement between the blade and the material. Preferably, each path of travel of the blade is defined by a plurality of small guide rollers arrayed in an arc adjacent each pulley. This arrangement bends the blade, without the friction of a stationary guide, in a large radius (avoiding excessive flexing of the blade), but does not require the space which would be needed by a large guide roller.

It is therefore one object of the present invention to provide a cutting machine with a taut blade which can be turned through a full circle while cutting the material. It is another object of the present invention to provide a cutting machine with an endless blade in two close paths of travel to define a single cutting edge. It is another object of the present invention to frictionlessly guide an endless blade through a large radius without the use of a large guide roller. Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 3 is an enlarged view taken on the line 3—3 of FIG. 1;

FIG. 4 is a view taken on the line 4—4 of FIG. 3;

Figure 1:
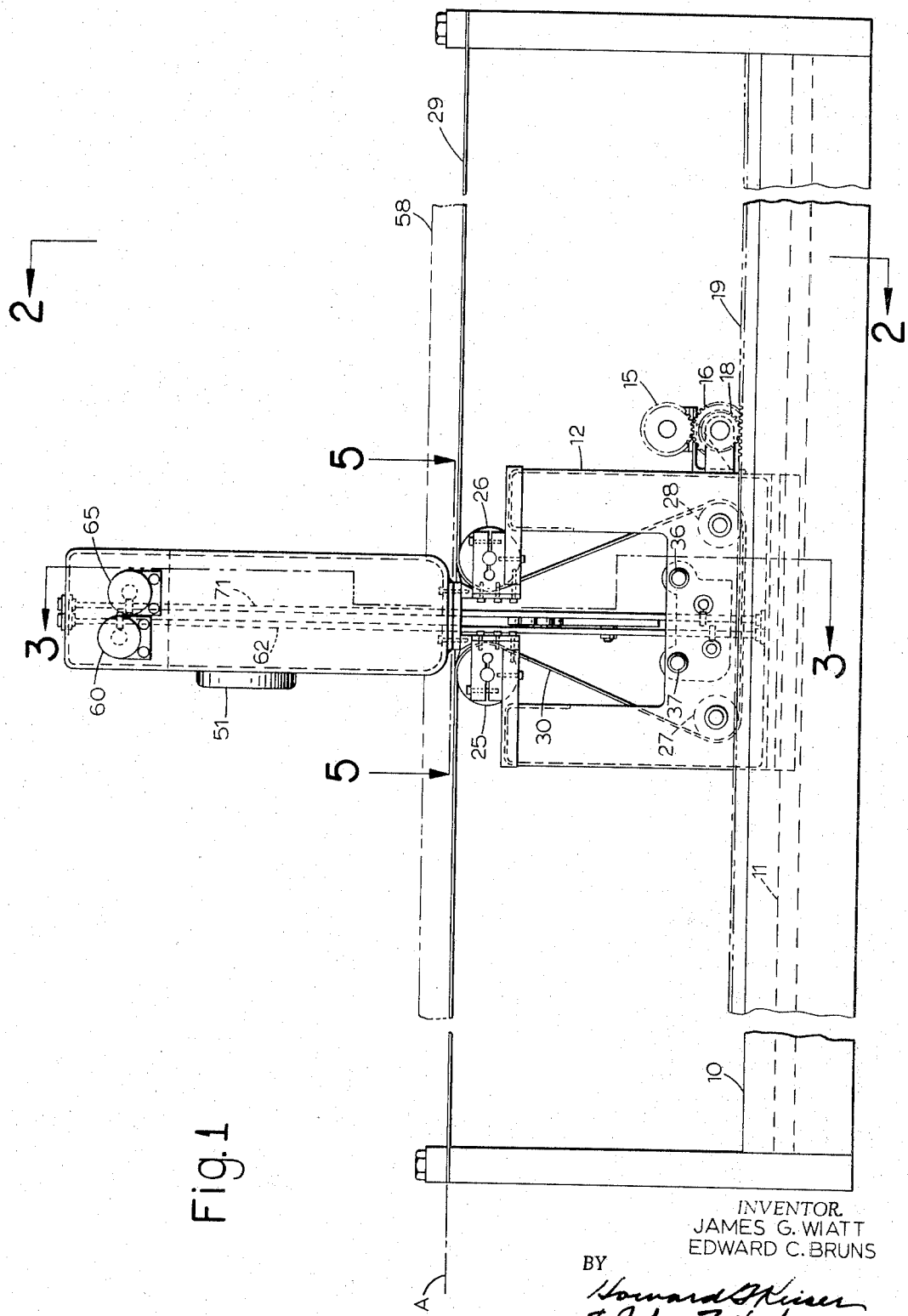
FIG. 1 is a view in elevation of the machine of the present invention.

The machine shown in the drawings has a frame 10 which has ways 11 to receive a carriage 12 for longitudinal movement along the frame. The longitudinal movement of the carriage on the frame is accomplished by means of a motor 13 mounted on a bracket 14 which is connected to the carriage. Gear 15 mounted on the shaft of motor 13 is in continuous engagement with a gear 16 mounted on a shaft 17 journaled in the carriage. The shaft 17 has a gear 18 at each end engaged with a rack 19 secured to each side of the frame 10.

The carriage has four rolls 25, 26, 27, 28 mounted therein which extend across the carriage. The rolls, which are on parallel spaced apart axes, comprise two upper rolls 25, 26 and two lower rolls 27, 28. A flexible band, or belt 29, which has one end secured to one end of the frame and the opposite end secured to the opposite end of the frame, is threaded through the rolls on the carriage. With this arrangement, the band 29 lies in a horizontal plane A except at the carriage where it is received over the upper rolls and under the lower rolls to define a loop 30 at the carriage. Two support shelves 31, 32 are mounted on the carriage in plane A and in spaced apart relation to define a gap 33 extending across the carriage. When the carriage moves along the frame, the loop 30 and gap 33 move with the carriage.

Figure 2:
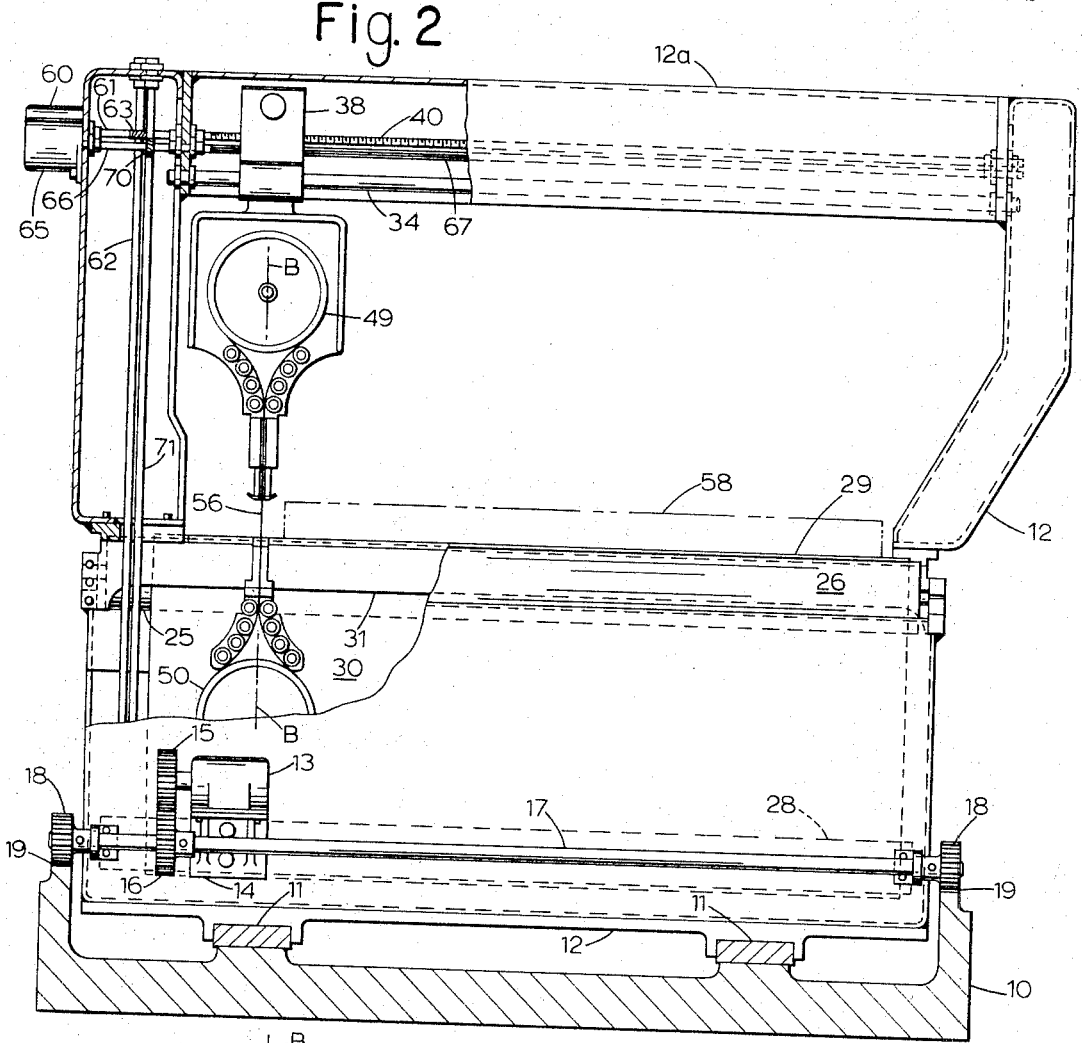
FIG. 2 is a view taken on the line 2—2 of FIG. 1.

The carriage 12, which extends above and below the band 29, straddles the band as shown best in FIG. 2. Two parallel shafts 34, 35 (see FIG. 4) extend across the carriage above plane A and two parallel shafts 36, 37 extend across the carriage in the loop 30 below plane A. The upper pair of shafts 34, 35 has a cross slide 38 slidably received thereon, and the lower pair of shafts 36, 37 has a cross slide 39 slidably received thereon. The upper slide 38 is in threaded engagement with a cross screw 40 journaled in the carriage and the lower slide 39 is in threaded engagement with a cross screw 41 journaled in the carriage.

A shaft 45 is rotatably received on axis B in upper slide 38 and a shaft 46, coaxial with shaft 45, is rotatably received in lower slide 39. A bracket 47 is connected to shaft 45 and a bracket 48 is connected to shaft 46. Pulley 49 is rotatably mounted on bracket 47 and pulley 50 is rotatably mounted on bracket 48. The pulleys 49 and 50 are mounted in parallel relation, in a common plane, and the centers of both lie in axis B. An electric motor 51 is mounted on the upper bracket 47, and power is transmitted to the motor from conductors 52 through slip rings 53 on shaft 45. Motor 51 drives the pulley 49.

Figures 6, 7:
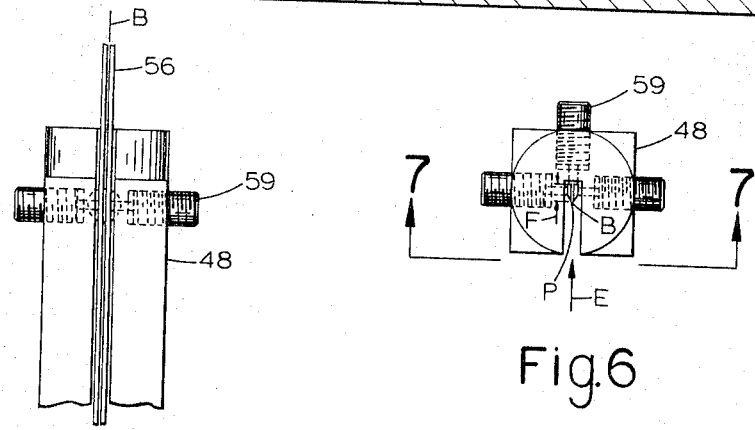
FIG. 6 is an enlarged view taken on the line 6—6 of FIG. 3.
FIG. 7 is a view taken on the line 7—7 of FIG. 6.
Figure 5:
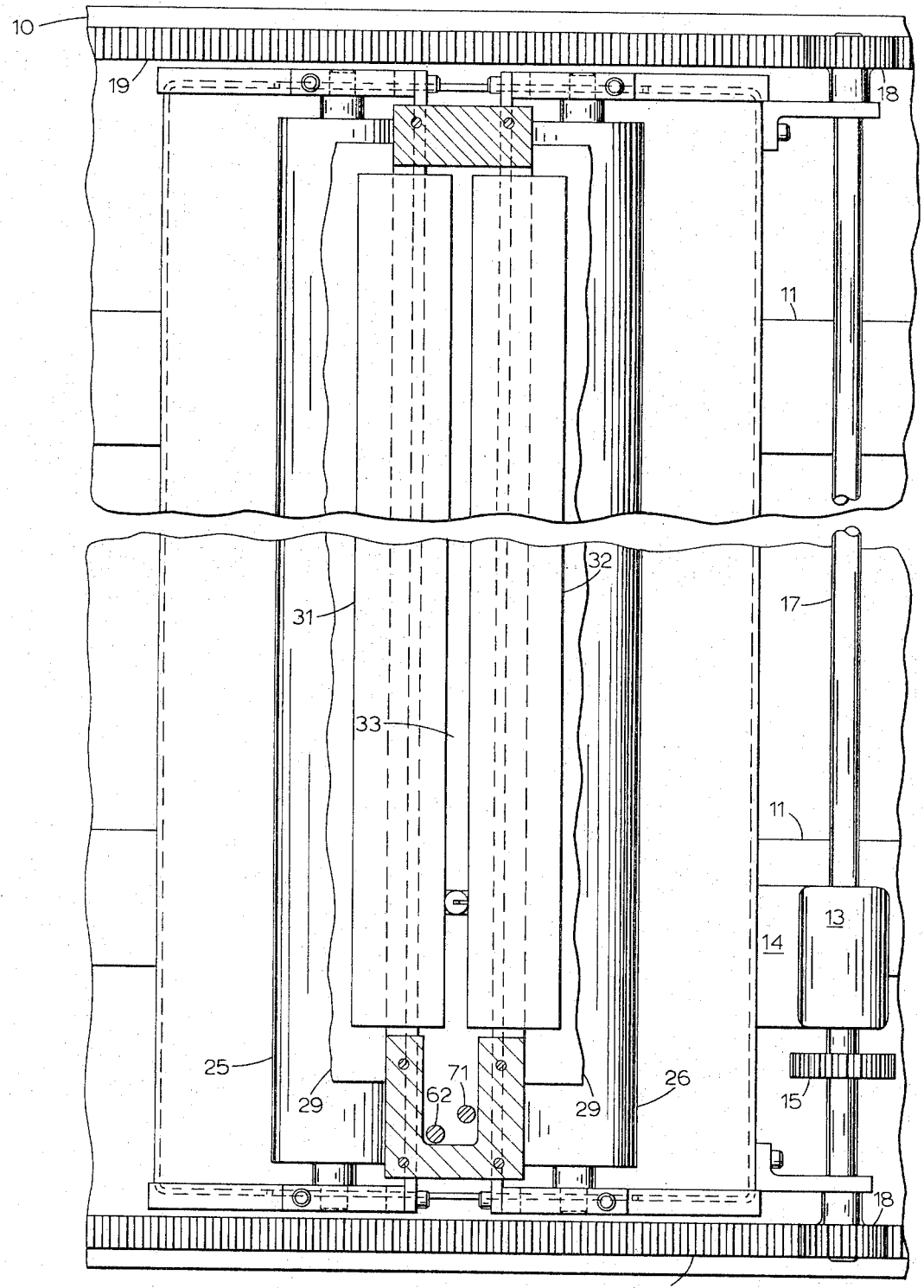
FIG. 5 is a view taken on the line 5—5 of FIG. 1.

An endless cutting blade 56 is received over the pulleys to extend, in two paths of travel 56a and 56b between the pulleys. On each bracket and on each side of axis B, there is mounted on circle C a plurality of rollers 57. Each roller has a radius $r$ substantially smaller than the radius $R$ of circle C. Points on the rollers 57 most remote from the center O of circle C define a circle D concentric with circle C and having a radius $(R+r)$. Circle D is tangent to axis B. Thus, the two paths of travel 56a, 56b of the endless blade are drawn closely together along axis B to extend in parallel relationship as the paths intersect the plane A (which is the cutting plane) at a point P in axis B. As shown best in FIG. 6, one edge of the blade is beveled so that the blade in the two paths of travel define a single cutting edge at the point P. Studs 59 in bracket 48 guide the blade as the two paths of travel intersect the cutting plane A.

A reversible motor 60 is mounted on the carriage and has a shaft 61 connected to cross screw 40 for rotation thereof. Shaft 61 is connected to vertical shaft 62 through helical gearing 63. Vertical shaft 62 is connected through helical gearing (not shown) to a shaft (not shown) which is connected to cross screw 41. Operation of motor 60, in one direction or the other, rotates screws 40 and 41 in unison, to move slides 38, 39 in unison, both in one direction or both in the opposite direction. Thus, universal relative movement in a plane between the cutting blade and the material 58 (which is received on the band 29 for cutting) is effected by longitudinal movement of the carriage 12 by motor 13 and by cross movement of the slides 38, 39 in unison by motor 60.

A reversible motor 65 is mounted on the carriage and has a shaft 66 connected to a horizontal spline shaft 67. Spline shaft 67 is in splined engagement with a worm 68 journaled in slide 38. The worm 68 is engaged with a worm wheel 69 secured to shaft 45. Shaft 66 is connected, through helical gearing 70, with a vertical shaft 71. Vertical shaft 71 is connected through helical gearing (not shown) to a shaft (not shown) which is connected to spline shaft 72. Spline shaft 72 is in splined engagement with a worm 73 journaled in slide 39. The worm 73 is engaged with a worm wheel 74 secured to shaft 46. Thus, operation of motor 65 in one direction or the other, will turn both brackets 47, 48 in unison in one direction or the other about axis B. As the brackets turn in unison, the pulleys 49, 50, which are always in parallel relation and always in a common plane, turn to turn the blade, changing the direction which the cutting blade faces. Thus, as relative movement is effected between the material and the cutting blade, the cutting blade can be turned to maintain the cutting edge in the proper direction for cutting. By means of motor 65 the blade can be maintained in alignment with the direction of relative movement between the material and the blade (the direction indicated by arrow E in FIG. 6) with the cutting edge facing the material. In other words the depth of the blade F can be maintained tangent to the path of the cut in the material.

Figure 8:
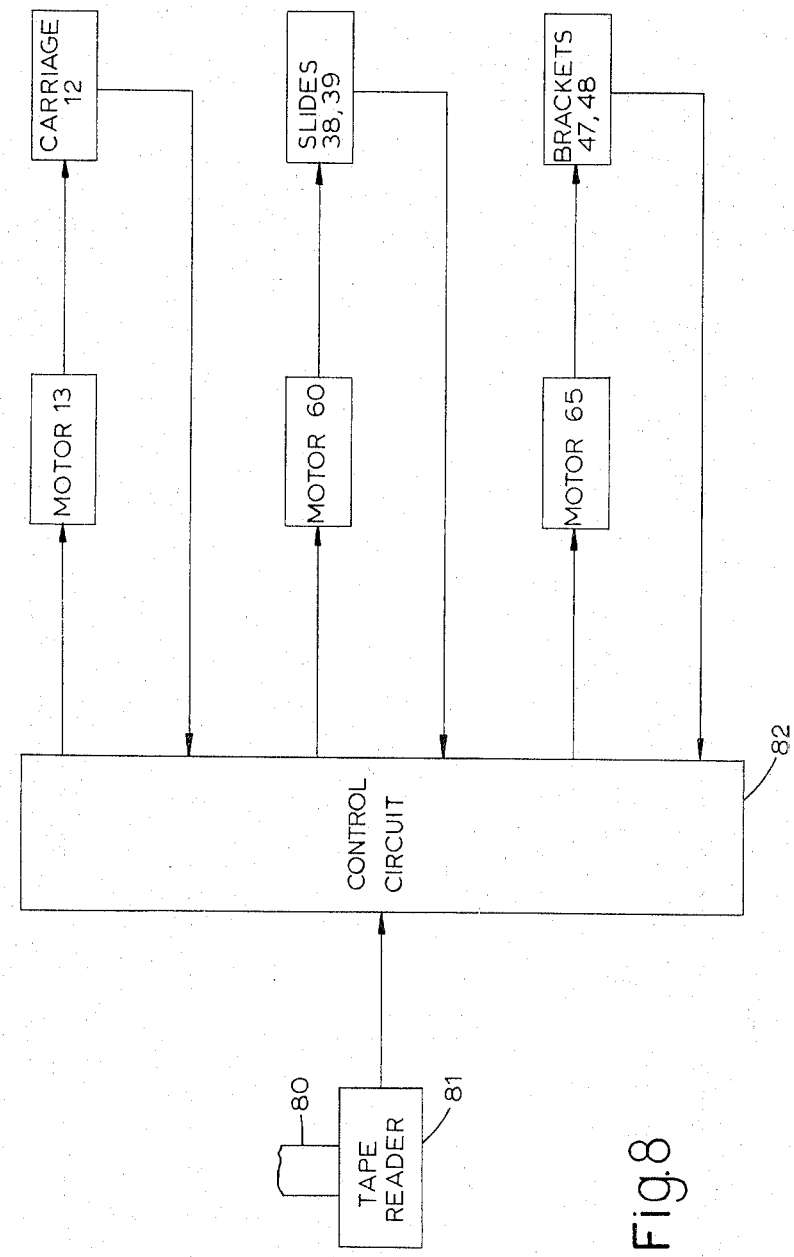
FIG. 8 is a schematic diagram of the control for the machine of FIG. 1.

Longitudinal movement of the carriage 12 by motor 13 will move the cutting blade 56 along the material, and cross movement of the slides 38 and 39 in unison will move the cutting blade 56 across the material. The material, supported by the band 29, remains stationary during the cutting operation. During a cutting operation, the reversible longitudinal movement of the carriage 12 by motor 13, the reversible cross movement of the blade 56 by motor 60, and the reversible turning movement of the blade by motor 65 will be coordinated by a control system shown in FIG. 8 to cut any desired pattern in the cloth. In this control system a tape 80, punched in accordance with the desired pattern to be cut, is fed to a tape reader 81 which transmits signals to a control circuit 82. The circuit 82 controls the operation of the motors 13, 60, and 65. The instantaneous longitudinal position of carriage 12, the instantaneous cross position of slides 38, 39, and the instantaneous angular position of brackets 47, 49 are fed back to the control system as indicated in FIG. 8.

With the band saw cutting machine disclosed herein, relative movement between the cutting blade and the material can occur in any direction and the pulleys can be turned to maintain the blade in proper cutting relationship to the material. The two paths of travel of the blade are brought together so the blade can be turned in any desired direction without interference. The two paths of travel of the blade lie in closely spaced parallel relationship and can cut any desired thickness of material. The guide rollers, although small to conserve space, are positioned to avoid sharp turns for the blade, which would minimize the life of the blade. The two slides 38, 39, each of which carry one of the pulleys, are both supported by the carriage and both are movable with respect to the carriage, which straddles the material supporting band 29. Thus, there is no frame member extending between the pulleys, and the blade can effect any desired cross cutting movement without producing interference between the material and a frame member.

What is claimed is:
1. A machine for cutting material in a cutting plane comprising:
   (a) two spaced pulleys, one on each side of the cutting plane, said pulleys having central axis of rotation passing through a common axis and substantially perpendicular to said common axis,
   (b) separate support means for each of said pulleys,
   (c) an endless blade carried by said pulleys and extending between said pulleys in two paths of travel along said common axis, said paths being close together and in parallel relation to said axis at the cutting plane,
   (d) means rotatably mounting each of said support means,
   (e) means to move said rotatably mounting means in a transverse direction relative to the material, and
   (f) means connected to both of said separate support means to turn both of said pulleys through 360° in unison.

2. A machine for cutting material in a cutting plane comprising:
   (a) two spaced pulleys, one on each side of the cutting plane,
   (b) separate support means for each of said pulleys,
   (c) an endless blade carried by said pulleys and extending between said pulleys in two paths of travel,
   (d) guide means to establish said paths close together at the cutting plane between said pulleys to define a single cutting edge at the cutting plane,
   (e) means rotatably mounting each of said separate support means,
   (f) means to move said rotatably mounting means in a transverse direction relative to the material, and
   (g) means connected to both of said separate support means to turn both of said pulleys through 360° in unison about an axis containing the single cutting edge of the blade.

3. A machine for cutting material in a cutting plane comprising:
   (a) two spaced pulleys, one on each side of the cutting plane,
   (b) an endless blade carried by said pulleys and extending between said pulleys in two paths of travel,
   (c) a first group of rollers disposed on one side of said blade adjacent one of said pulleys and engaging said blade in one of said paths of travel,
   (d) a second group of rollers disposed on the other side of said blade adjacent said one pulley and engaging said blade in the other of said two paths of travel, (e) a third group of rollers disposed on one side of said blade adjacent the other of said pulleys and engaging said blade in said one path of travel, (f) a fourth group of rollers disposed on the other side of said blade adjacent said other pulley and engaging said blade in said other path of travel, (g) said first and second groups of rollers cooperating with said blade in said two paths of travel to bring said two paths of travel together and parallel to each other between said one pulley and the cutting plane, (h) said third and fourth groups of rollers cooperating with said blade in said two paths of travel to bring said two paths of travel together and parallel to each other between said other pulley and the cutting plane, and (i) means to turn both of said pulleys through 360° in unison about an axis passing through the cutting plane where said paths of travel intersect the cutting plane.

4. A machine for cutting material in a cutting plane comprising:
(a) two spaced pulleys, one on each side of the cutting plane,
(b) an endless blade carried by said pulleys and extending between said pulleys in two paths of travel,
(c) a first group of rollers disposed on one side of said blade adjacent one of said pulleys and engaging said blade in one of said paths of travel,
(d) a second group of rollers disposed on the other side of said blade adjacent said one pulley and engaging said blade in the other of said two paths of travel,
(e) a third group of rollers disposed on one side of said blade adjacent the other of said pulleys and engaging said blade in said one path of travel,
(f) a fourth group of rollers disposed on the other side of said blade adjacent said other pulley and engaging said blade in said other path of travel,
(g) said first and second groups of rollers cooperating with said blade in said two paths of travel to bring said two paths of travel together and parallel to each other between said one pulley and the cutting plane,
(h) said third and fourth groups of rollers cooperating with said blade in said two paths of travel to bring said two paths of travel together and parallel to each other between said other pulley and the cutting plane,
(i) said blade defining a single cutting edge at the cutting plane, and
(j) means to turn both of said pulleys through 360° in unison about an axis containing said single cutting edge of said blade at the cutting plane.

5. A machine for cutting material in a cutting plane comprising:
(a) two spaced pulleys, one on each side of the cutting plane,
(b) an endless blade carried by said pulleys and extending between said pulleys in two paths of travel,
(c) a first group of rollers disposed on one side of said blade adjacent one of said pulleys and engaging said blade in one of said paths of travel,
(d) a second group of rollers disposed on the other side of said blade adjacent said one pulley and engaging said blade in the other of said two paths of travel,
(e) a third group of rollers disposed on one side of said blade adjacent the other of said pulleys and engaging said blade in said one path of travel,
(f) a fourth group of rollers disposed on the other side of said blade adjacent said other pulley and engaging said blade in said other path of travel,
(g) each of said groups of rollers having the center of each of said rollers of said group disposed on the same radius of curvature, the radius of each of said rollers being substantially smaller than the radius of curvature for said group of rollers, (h) said first and second groups of rollers cooperating with said blade in said two paths of travel to bring said two paths of travel together and parallel to each other between said one pulley and the cutting plane,
(i) said third and fourth groups of rollers cooperating with said blade in said two paths of travel to bring said two paths of travel together and parallel to each other between said other pulley and the cutting plane, and
(j) means to turn both of said pulleys through 360° in unison about an axis passing through the cutting plane where said paths of travel intersect the cutting plane.

6. A cutting machine comprising in combination:
(a) two spaced pulleys,
(b) an endless blade carried by said pulleys and extending between the pulleys in two paths of travel,
(c) a plurality of rollers positioned adjacent each pulley and adjacent each of said paths of travel of said blade, said rollers guiding said blade to bring said paths of travel close together at a point between the pulleys, and
(d) means to turn both of said pulleys in unison through 360° about an axis passing through said point.

7. A cutting machine comprising in combination:
(a) two spaced pulleys,
(b) an endless blade carried by said pulleys and extending between the pulleys in two paths of travel,
(c) a plurality of rollers at each pulley adjacent the blade in each of said paths of travel to guide the blade along each of said paths of travel, said rollers establishing said paths of travel adjacent to and parallel with an axis passing through the center of each of the pulleys,
(d) means to rotate one of said pulleys to drive the blade along said paths of travel, and
(e) motive means to turn both of said pulleys in unison through 360° about said axis.

8. A machine for cutting material in a cutting plane comprising in combination:
(a) two spaced brackets, one on each side of the cutting plane,
(b) a pulley rotatably mounted on each bracket,
(c) an endless blade carried by said pulleys and extending between the pulleys in two paths of travel, said paths close together at the cutting plane,
(d) a motor mounted on one of said brackets to rotate the pulley and drive the blade along said paths of travel, and
(e) means connected to both of said brackets to turn both of said brackets in unison about an axis passing through said cutting plane where said paths of travel intersect the cutting plane.

9. A machine for cutting material in a cutting plane comprising in combination:
(a) two spaced brackets, one on each side of the cutting plane,
(b) a pulley rotatably mounted on each bracket,
(c) an endless blade carried by said pulleys and extending between the pulleys in two paths of travel, said paths close together at the cutting plane,
(d) means to rotate one of the pulleys to drive the blade along said paths of travel,
(e) means to effect relative longitudinal and transverse movement between the material and the blade in said cutting plane, and
(f) means connected to said brackets to turn both of said brackets in unison in coordination with said relative movement means.

10. A machine for cutting material in a cutting plane comprising in combination:
(a) a carriage straddling the material and having two brackets rotatably mounted thereon, one on each side of the cutting plane, (b) a pulley rotatably mounted on each of said brackets,
(c) an endless blade carried by said pulleys and extending between the pulleys in two paths of travel,
(d) means to guide the blade to bring said paths of travel close together at the cutting plane,
(e) a motor mounted on one of said brackets to rotate the pulley rotatably mounted on said one bracket and drive the blade in said paths of travel,
(f) first motor driven means to effect relative longitudinal and relative transverse movement between the blade and the material, and
(g) second motor driven means to turn said brackets in unison in coordination with said first motor driven means to maintain the blade in proper cutting relation to the material during the relative movement between the blade and the material.

11. A machine for cutting material comprising in combination:
(a) means to support the material in a cutting plane,
(b) two spaced pulleys, one on each side of the cutting plane,
(c) an endless blade carried by said pulleys and extending between the pulleys in two paths of travel, said paths close together at the cutting plane,
(d) means to turn both of the pulleys 360° in unison about a vertical axis passing through the cutting plane where said paths of travel intersect the cutting plane, and
(e) means to move both of said pulleys in unison across the material in coordination with said turning means.

12. A machine for cutting material comprising in combination:
(a) a stationarily mounted frame,
(b) means to support the material in a cutting plane,
(c) a carriage mounted on the frame,
(d) two spaced brackets mounted on the carriage, one on each side of the cutting plane,
(e) a pulley mounted on each bracket,
(f) an endless blade carried by said pulleys and extending between the pulleys in two paths of travel,
(g) means to guide the blade to bring said paths of travel together at the cutting plane,
(h) a motor to effect relative longitudinal movement between the material and the carriage,
(i) a motor to move the brackets relative to the carriage in unison across the material in a transverse direction, and
(j) means to turn the pulleys through 360° in unison about a vertical axis passing through the cutting plane where said paths of travel intersect the cutting plane.

13. A machine for cutting material comprising in combination:
(a) a stationarily mounted frame,
(b) means to support the material in a cutting plane,
(c) a carriage mounted on the frame for longitudinal movement relative to the frame,
(d) two spaced brackets mounted on the carriage, one one each side of the cutting plane,
(e) a pulley mounted on each bracket,
(f) an endless blade carried by said pulleys and extending between the pulleys in two paths of travel,
(g) means to guide the blade to bring said paths of travel close together and in parallel relation at the cutting plane,
(h) a motor to move the carriage longitudinally to effect relative longitudinal movement between the material and the carriage,
(i) a motor to move the brackets in unison across the material in a transverse direction, and
(j) a motor to turn the brackets in unison.

References Cited
UNITED STATES PATENTS

| | | | |
|---|---|---|---|
| 308,188 | 11/1884 | Miller | 143—19 |
| 1,172,058 | 2/1916 | Scheyer | 83—71 |
| 2,415,877 | 2/1947 | Hajek. | |
| 2,843,917 | 12/1956 | Crane et al. | 83—201.07 |
| 3,245,295 | 4/1966 | Mueller | 83—56 |

FOREIGN PATENTS

| | | |
|---|---|---|
| 583,876 | 10/1958 | Italy. |

WILLIAM W. DYER, Jr., *Primary Examiner.*

JAMES M. MEISTER, *Examiner.*